United States Patent [19]

McCanny et al.

[11] Patent Number: 4,533,993
[45] Date of Patent: Aug. 6, 1985

[54] MULTIPLE PROCESSING CELL DIGITAL DATA PROCESSOR

[75] Inventors: John V. McCanny; John G. McWhirter, both of Malvern, England

[73] Assignee: National Research Development Corp., London, England

[21] Appl. No.: 406,916

[22] Filed: Aug. 10, 1982

[30] Foreign Application Priority Data

Aug. 18, 1981 [GB] United Kingdom ............... 8125222

[51] Int. Cl.³ .............................................. G06F 7/00
[52] U.S. Cl. .................................................. 364/200
[58] Field of Search ............................. 364/200, 900

[56] References Cited

U.S. PATENT DOCUMENTS

| | | | |
|---|---|---|---|
| 3,979,728 | 9/1976 | Reddaway | 364/200 |
| 4,065,808 | 12/1977 | Schomberg et al. | 364/200 |
| 4,174,514 | 11/1979 | Sternberg | 364/200 |
| 4,215,401 | 7/1980 | Holsztynski et al. | 364/200 |
| 4,251,861 | 2/1981 | Mago | 364/200 |
| 4,270,169 | 5/1981 | Hunt et al. | 364/200 |
| 4,270,170 | 5/1981 | Reddaway | 364/200 |
| 4,384,273 | 5/1983 | Ackland et al. | 364/900 |
| 4,412,303 | 10/1983 | Barnes et al. | 364/900 |

OTHER PUBLICATIONS

The Radio and Electronic Engineer, vol. 45, No. 3, Mar. 1975, pp. 116-120, London, GB; P. M. Thompson et al.: "Digital Arithmetic Units for a High Data Rate".
IEEE Transactions on Computers, vol. C-24, No. 3, Mar. 1975, pp. 317-322, New York, US; J. Deverell: "Pipeline Iterative Arithmetic Arrays".
Electronics Letters, vol. 8, No. 4, 24th Feb. 1972, pp. 100-101, Hitchin, Herts, GB; K. J. Dean et al.: "General Iterative Array".
Signal Processing: Theories and Applications, Proceedings of Eusipco-80, First European Signal Processing Conference, 16th-18th Sep. 1980, Lausanne, CH, North-Holland Publishing Company, Amsterdam, NL; L. Ciminiera et al.: "High Speed Correlator Circuits".
IEEE Transactions on Computers, vol. 21, No. 8, Aug. 1972, pp. 880-886, IEEE, New York, US; T. G. Hallin et al.: "Pipelining of Arithmetic Functions".
Automatisme, vol. 21, No. 10, Oct. 1976, pp. 302-314, Paris, FR; M. Mrayati et al.: "Conception et Realisation de Filtres Numberiques".
Electronics Letters, vol. 18, No. 6, Mar. 1982, pp. 241-243, London, GB; J. V. McCanny et al.: "Implementation of Signal Processing Functions Using 1-Bit Systolic Arrays".
Computer, Jan. 1980 (IEEE), pp. 26-40, Foster, M. J. and Kung, M. T.
Systolic Arrays (for VLSI), Kung and Leiserson, in "Introduction to VLSI Systems" by Mead & Conway, Addison-Wesley (1980).
"Matrix Triangularization by Systolic Arrays", Proc. Spie, vol. 28, Real Time Signal Processing IV (1981) Kung and Gentleman.
IEEE Transactions on Communications, Apr. 1976, pp. 418-425, Lyon, R. F.

Primary Examiner—Gareth D. Shaw
Assistant Examiner—Jameson Lee
Attorney, Agent, or Firm—Cushman, Darby & Cushman

[57] ABSTRACT

The invention provides a digital data processor which has been systemetized down to bit level. The processor includes a regular array of identical processing cells which perform a logic operation on incoming bits. The cells repeatedly perform a cell operation under the control of clocks which govern the inputting to and outputting from the cell of data bits. Each bit takes part in a maximum of one cell operation in one repetition of the clock having the highest repetition frequency.

Processing cell arrays for dealing with larger numbers may be readily built up from smaller arrays used for smaller numbers.

Having obtained a fully working design for one type of processing cell, the full array consisting of a plurality of cells is proven.

15 Claims, 14 Drawing Figures

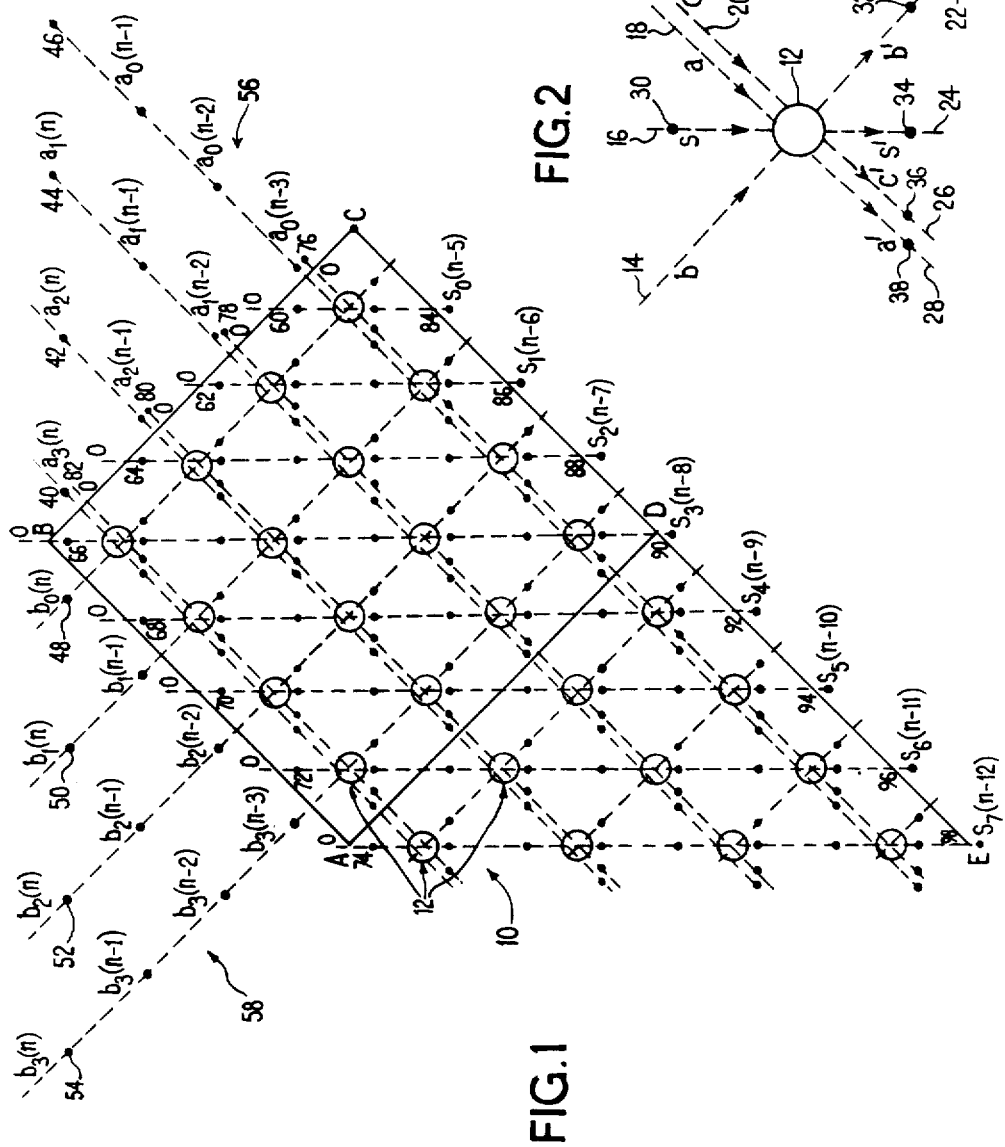

MULTIPLE PROCESSING CELL DIGITAL DATA PROCESSOR

FIELD OF THE INVENTION

The invention concerns improvements in or relating to integrated circuits and especially, but not exclusively to modular architectures at bit level particularly suitable for large scale integration (LSI) and very large scale integrated (VLSI) data processors.

BACKGROUND OF THE INVENTION

Some prior art designs for data processing circuits in LSI and VLSI have formed a continuation of the relatively random constructions used in smaller scale integration and hybrid circuits. Such approaches tend to produce circuits which consist of blocks of random logic all of which have to be individually designed. On going to VLSI these methods become impractical for a number of reasons. One such reason is that the characteristics of possibly hundreds of thousands of transistors may have to be tailored individually. Secondly, totally random layouts may take many man years of effort to construct and subsequently check. Additionally, the circuits are difficult and sometimes impossible to test and may require extra testing circuits to be incorporated into the design. In addition, for example, the resulting use of long conducting interconnections between circuit elements which cannot be positioned close together on a chip increases stray capacitance. This acts to reduce the potential switching speed of a circuit. Additionally, the need for large drivers is concomitantly increased.

For LSI and VLSI an additional problem with timing delays is introduced due to transmission line effects coming into play. These arise when the total resistance of interconnections is relatively high thus making the transmission line component of any time delays dominant. In prior art LSI such transmission line effects are observed in polysilicon wires. The reasons for this can be seen by considering that, as the cross sections of integrated circuit components are scaled down for VLSI, the resistance per unit length of conductor paths increases quadratically with scaling factor. As a result, transmission line effects may be observed even in high conductivity connections such as aluminium wires on VLSI chips. A major limitation of such effects is that they cause data propagation delays proportional to (length of wire)$^2$. The maximum speed of operation of a circuit is therefore limited.

Overall, synchronization of signals across a circuit therefore demands in-depth analysis and leads to complex designs to compensate for the delays involved.

At a higher level, rationalization of data processor architecture has been attempted by use of modular designs employing regular arrays of sub-processors, each of which performs a specified function at data word level. The individual sub-processors then work in sympathy with each other to produce an overall data processing function. However, the design advantages of the systematic modular approach at sub-processor level have not been taken into account within the subprocessors themselves.

Prior art techniques have included "ripple-through" multipliers ie multipliers in which a multiplication step involves the completion of the multiplication of a digit of the multiplier by the multiplicand and in which a following step does not begin until the digit of the multiplier involved in a previous step has rippled through and all the processing circuits have interacted with eachother to complete that step. These have employed arrays of multiplying cells for multiplying the bits of the multiplier and multiplicand. Ripple-through designs, however, have time penalties due to the necessity to ripple through each digit of the multiplier and its associated carry-over digits at each stage of the multiplication. Attempts to alleviate these time penalties have led to introduction of "pipelining" into the cell arrays ie the splitting up of the arrays into sections by introducing latches between some of the cells in order to split each stage of the multiplication into sub-stages such that it is now necessary only for each sub-stage to be completed before the next is allowed to begin. Multiplier digits may, therefore, be fed in and product digits output at a rate faster than is allowed by the ripple-through design.

Prior art pipelined arrays have included Guild arrays, shift-and-add arrays and carry-save arrays. However, in all these prior art arrays, for each bit of the multiplier, it is necessary at some stage in the multiplication to broadcast the bit to all bits of the multiplicand in a single time interval. For a multiplication involving a multiplicand with more than a small number of bits, such broadcasting leads to delays which severely limit the maximum clock frequency attainable as the total capacitance loading on the appropriate line (gate capacitance plus interconnect capacitance) may be sizeable. Large current (and area) drivers can be used to improve propagation speeds on such a line, but they themselves impose a delay—the driver amplifer delay—on the relevant signal. Moreover the physical size of the driver required often forces a compromise on circuit speed.

An object of the invention is to provide a systematic approach at bit level to integrated circuit design which allows fast circuit operation.

SUMMARY OF THE INVENTION

According to the present invention there is provided a digital data processor including
digital data input means for inputting data bits connected to
a regular array of bit level processing cells, each arranged for repeatedly performing a cell operation wherein the operation comprises receiving one or more incoming bits, performing one or more logic operations on the incoming bits and outputting resulting bits,
cell interconnection lines connecting each cell with immediately neighbouring cells,
one or more latches disposed along each interconnection line, each latch being adapted to latch a single bit
and clocking means for controlling the propagation of bits along the interconnection lines by governing the operation of the latches including at least one clock having a maximum repetition frequency wherein each data bit takes part in a maximum of one processing cell operation in one repetition of the clock having the maximum frequency.

Preferably, the processor is arranged for pipelined operation and has a digital data input means which includes means for inputting digital words corresponding to at least two parameters such that each word's bits enter the array staggered in time and position and, after processing, a final resulting word is output from the array such that its bits are staggered in time and position. Preferably, the stagger interval in time is of an integral number of clock pulse cycles duration and the stagger interval in distance is of one processor cell repeat distance.

A regular array of processing cells for a large digital data processor may be constructed by directly interfacing a plurality of processing cell arrays from smaller digital data processors without making modifications to the smaller arrays.

The data processor may comprise a pipelined multiplier for calculating the product.

$$s = s^o + (a \times b) + c$$

where the a, c are expressed as l-bit words, the b are expressed as m-bit words, and the s, $s^o$ are expressed as (l+m)-bit words wherein the processing cells and interconnections are arranged such that a cell receiving in parallel digits a, b, c and s of numbers a, b, c and s combined with $s^o$ outputs digits $$a' = a$$

$$b' = b$$

$$c' = (a \cdot b) \cdot s + (a \cdot b) \cdot c + s \cdot c$$

$$s' = s \oplus a \cdot b \oplus c$$

and wherein the data input means comprises means for inputting the numbers $s^o$, a, b and c to the array of processing cells.

The pipelined multiplier may be adapted for calculating the product $$s = a \times b$$

where a and b are signed binary numbers in sign-magnitude form. This may be achieved by multiplying together the magnitudes of a and b and additionally providing an EXCLUSIVE-OR gate for calculation of the sign of s.

In a pipelined multiplier for multiplying an l-bit binary number, a, by a m-bit binary number, b, and where $s^o$ and c are equal to zero, the processing cell array preferably consists of a rectangular sub-array of lxm processing cells adjacent to a triangular sub-array of 1/2(l+1) cells. The digital data input means is then preferably arranged for inputting the digits of b in a staggered manner to the m cells along an edge of the rectangular sub-array and for inputting the digits of a in a staggerred manner to the l cells along an adjacent edge of the rectangular sub-array.

The pipelined multiplier may be adapted for calculating the product s=a×b where a and b are expressed in l and m-bit respectively two's complement notation. This may be achieved by adding a control line to at least some of the processing cells such that, when a first type of control signal is applied to the control line, the cell performs its cell operation using the complement of the received digit, b, and, when a second type of control signal is applied to the control line, the cell performs its cell operation using the received digit, b. Additionally, the data input means may be arranged to input the number a to the processing cell array in a staggered manner in l-bit two's complement notation and to input the number b to the array in a staggered manner in (l+m)-bit two's complement notation.

The data processor may comprise a circuit for calculating the matrix-vector multiplication $$Y = WX + Z$$

where
W = a Walsh transform matrix ie a square matrix each of the elements of which are equivalent to either 1 or −1
Z = a vector of numbers, z
and
X, Y = vectors representing parameters x and y in digital number form wherein the processing cells and interconnections are arranged such that a cell receiving in parallel digits x, y, c, and w (in two-digit form, (u,v)) outputs digits:

$$x' = x$$

$$u' = u$$

$$v' = v$$

$$y' = y \oplus c \oplus r$$

$$c' = (y \cdot c) + (y \cdot r) + (c \cdot r)$$

where $r = x \cdot u \cdot \bar{v} + \bar{x} \cdot \bar{u} \cdot v$ and wherein the data input means comprises means for inputting the values of X, and W and means for initially setting the value of Y to that of Z at the beginning of the calculation.

The digital data processor may comprise a 'bit-slice' multiplier for calculating Y where $$Y = WX + Z$$

and
W = a matrix the elements of which take the values 1 or 0
Z = a vector of numbers z
X, Y = vectors representing parameters x and y in digital number form wherein the processing cells and interconnections are arranged such that a cell receiving in parallel digits x, y, c and w outputs digits:

$$x' = x$$

$$w' = w$$

$$y' = y \oplus (w \cdot x) \oplus c$$

$$c' = (w \cdot x) \cdot y + (w \cdot x) \cdot c + y \cdot c$$

and wherein the data input means includes means for inputting the values of X and W and means for initially setting the value of Y to that of Z at the beginning of the calculation.

In the case of both the Walsh transform and the bit-slice multiplier, larger processors to deal with calculations where the w take multi-bit form may be built up by assembling several smaller processors together to provide the more complex data processor.

Preferably the processing cells are arranged to form a regular, repeated pattern and may, for example, form a two dimensional (2D) square lattice configuration. In such a configuration each cell's immediate neighbours consist of four neighbours which lie in directions at 90° to each other along, say, the North, South, East and West directions and four lying along the NW, NE, SE and SW directions. The latches and cell interconnections may then be disposed such that four input connections are arranged for inputting four bits to each cell from a first four associated latches and four output connections are arranged for outputting four bits to a second four associated latches.

The data processor cell array may include higher level processing cells consisting of a plurality of smaller processing cells with internal latches removed to provide a larger basic processing cell. In the pipelined multiplier, for example, a higher level processing cell may be provided from $N^2$ (where $N>1$) basic processing cells.

Alternatively, the logic required for a higher level processing cell may be designed particularly for the cell instead of being provided by existing lower level logic.

Preferably the input means is arranged to allow the bits of digital numbers a and b or x and y to be fed to the input means in parallel from an external source and arranged to impose a delay to each bit so that the bits arrive at the processing cell array in a staggered manner.

A cell operation may extend for the duration of a first type of clock pulse followed by a second type of clock pulse such that, for each first type of clock pulse, each latch releases the bit latched therein and, for each second type of clock pulse, each latch accepts an incoming bit.

BRIEF DESCRIPTION OF THE INVENTION

The invention will now be described by way of example only with reference to the accompanying drawings comprising:

FIG. 1 illustrating schematically the design of a portion of a pipelined multiplier for multiplying unsigned binary numbers according to a first aspect of the invention.

FIG. 2 illustrating schematically the operation of a processing cell used in the multiplier of FIG. 1.

FIG. 3 illustrating in block diagram form a portion of an extended version of the pipelined multiplier of FIG. 1.

FIG. 4 illustrating schematically a first modification of the portion of pipelined multiplier of FIG. 1 for multiplying signed numbers.

FIG. 5 illustrating schematically a second modification of the portion of pipelined multiplier of FIG. 1 for multiplying signed binary numbers.

FIG. 6 illustrating schematically the operation of a processing cell used in the multiplier of FIG. 5.

FIG. 7 illustrating schematically the design of a portion of a pipelined Walsh transform processor according to a third aspect of the invention.

FIG. 8 illustrating schematically the operation of a processing cell used in the Walsh transform processor of FIG. 7.

FIG. 9 illustrating schematically the operation of an alternative processing cell.

FIG. 10 illustrating schematically a master/slave latch.

FIG. 11 illustrating in graphical form clocking waveforms for application to the latch of FIG. 10.

FIG. 12 illustrating in graphical form clocking waveforms for application to the processing cell of FIG. 9.

FIG. 13 illustrating schematically a portion of a data processor employing the processing cell of FIG. 9.

FIG. 14 illustrating schematically the input of matrix element bits to the portion of the data processor of FIG. 13.

DETAILED DESCRIPTION OF THE INVENTION

Figure 3:
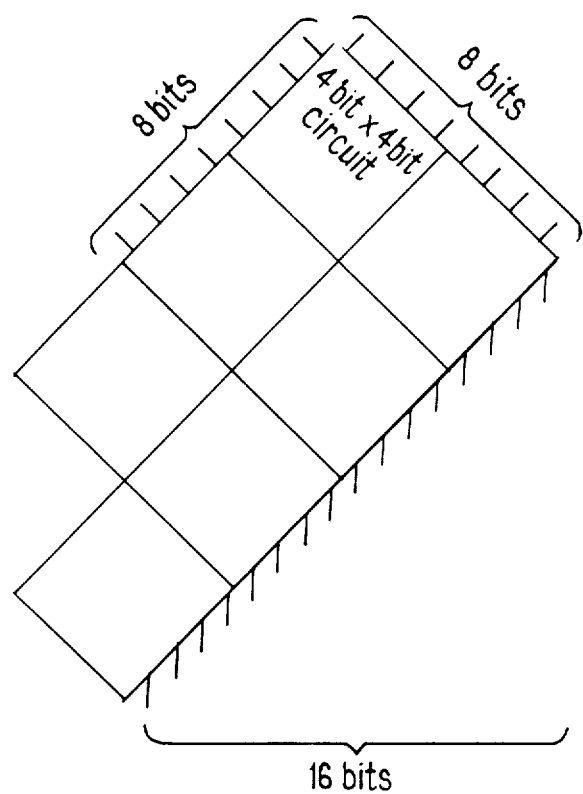

In FIG. 1 the pipelined multiplier is for use in calculating the binary number, s, where:

$$s = s^o + (a \times b) + c$$

with a, b and c as unsigned four-bit numbers, s as an unsigned eight-bit number, $s^o$ a number which must be expressed within eight bits and which has a value sufficiently low to keep s(n) within eight bits.

The multiplier includes an array, 10, of identical processing cells, 12, the cells forming a square lattice arrangement and being interconnected by conducting lines.

The arrangement of a cell and interconnecting lines is shown in more detail in FIG. 2.

In FIG. 2 a cell, 12, has input lines 14, 16, 18 and 20 for bringing data bits into the cell and output lines 22, 24, 26 and 28 for taking data bits out of the cell. Each line transfers one bit to or from the cell 12 in one cell operation.

The cell, 12, is a gated full adder which operates such that, for bits a, b, c and s input to the cell on lines 18, 14, 20 and 16, respectively, bits a', b', c' and s' are output on lines 28, 22, 26 and 24, respectively.

$$a' = a$$

$$b' = b$$

$$c' = (a \cdot b) \cdot s + (a \cdot b) \cdot c + s \cdot c$$

and $$s' = s \oplus a \cdot b \oplus c$$

Latches in the form of memory sites 30, 32, 34, 36 and 38, each for storing a single bit, are disposed in lines 16, 22, 24, 26 and 28, respectively.

The operation of each of the cells, 12, is governed by a clocking means (not shown in the diagrams) which outputs clock pulses such that a first pulse causes each memory site to output its contents into the adjoining line in the directions shown in FIG. 2 and a second pulse causes each memory site to store a resulting incoming bit. On the occurrence of a first type of clock pulse, sites equivalent to 30, 32, 36 and 38 output their stored bits to a processing cell equivalent to cell 12, so that it may perform a cell operation. At the same time sites equivalent to 34, on occurrence of a first type of clock pulse, output their stored bits to memory sites equivalent to 30.

The array, 10, of processing cells in FIG. 1 may be considered to be made up of a square array of sixteen cells enclosed within the area ABCD plus a triangular array of ten cells within the area ADE. The digits of input numbers a enter the array, 10, across the edge BC while the digits of input numbers b enter the array across the edge AB. The digits of a are input to the multiplier in parallel via ports 40, 42, 44 and 46 such that $a_0(n)$ enters at port 46, $a_1(n)$ at port 44, $a_2(n)$ at port 42 and $a_3(n)$ at port 40 where $a_i(n)$ = the $i^{th}$ bit of the $n^{th}$ in the series of numbers a

The digits of a(n) are then passed down a delay line array, 56, of latches of the same type as memory sites 30, 32, 34, 36 and 38 so that they are input to the cell array, 10, across the edge BC in a staggered manner.

The digits of b are input to the multiplier in parallel via ports 48, 50, 52 and 54 such that $b_0(n)$ enters at port 48, $b_1(n)$ at port 50, $b_2(n)$ at port 52 and $b_3(n)$ at port 54. The digits of b(n) are then passed down a delay line array, 58, of latches so that they are input to array 10 across the edge AB in a staggered manner. The passage of the digits along the delay line arrays is governed by the same clocking means which governs the passage of digits through the array, 10. Only two types of non-overlapping clock pulses are, therefore, required to control the whole multiplier.

In an alternative form of the FIG. 1 processor, delay line arrays equivalent to arrays 56 and 58 are provided on separate chips which are interfaced to a chip carrying the processing cell array, 10.

The values of $s^o(n)$ and c(n) are provided for by programming the multiplier so that $s_0^o(n)$ is latched into site 60 at the same time that $a_0(n)$ arrives at edge BC, $s_1^o(n)$ is latched into site 62 at the same time that $a_1(n)$ arrives at edge BC, $s_2^o(n)$ is latched into site 64 at the same time that $a_2(n)$ arrives at edge BC, $s_3^o(n)$ is latched into site 66 at the same time that $a_3(n)$ arrives at edge BC, $s_4^o(n)$ is latched into site 68 at the same time that $b_1(n)$ arrives at edge AB, $s_5^o(n)$ is latched into site 70 at the same time that $b_2(n)$ arrives at edge AB, $s_6^o(n)$ is latched into site 72 at the same time that $b_3(n)$ arrives at edge AB and $s_7^o(n)$ is latched into site 74 one clock cycle after $s_6^o(n)$ is latched into site 72. Additionally, $c_0(n)$ is latched into site 76, $c_1(n)$ is latched into site 78, $c_2(n)$ is latched into site 80 and $c_3(n)$ is latched into site 82 at the same times that $a_0(n)$, $a_1(n)$, $a_2(n)$ and $a_3(n)$ respectively arrive at edge BC.

The numbers $s^o(n)$ and c(n) may, or example, be numbers carried over from a previous computation (not indicated in FIG. 1).

In the embodiment of FIG. 1 the multiplier has been set up to calculate $$s(n) = a(n) \times b(n)$$

ie $$s^o(n) = c(n) = 0$$

The result, s(n), is output across edge CE of array 10 in a staggered manner as illustrated in FIG. 1. The least significant bit, $s_0(n)$ emerges at port 84 five pulse cycles after a(n) is input to ports 40–46 and $s_1(n), s_2(n), s_3(n), s_4(n), s_5(n), s_6(n)$ and $s_7(n)$ emerge at ports 86, 88, 90, 92, 94, 96 and 98 respectively, $s_7(n)$ emerging twelve pulse cycles after a(n) is input.

The triangular array, ADE thus serves to process the 'carry over' bits of s(n). Although only ten processing cells are required for the carry-over section, for simplicity of fabrication, they may be provided by an additional 4×4 cell square array with six of the square array cells redundant.

FIG. 3 illustrates how the multiplier of FIG. 1 may be extended for use in multiplying together two unsigned eight-bit numbers. In the extended multiplier, seven of the basic 4×4 processing cell square arrays are used with three 4×4 arrays for processing the carry-over digits. As in the case of the multiplier of FIG. 1, only ten of the cells in two of the three 4×4 carry-over arrays are used, leaving six cells redundant.

The pipelined multiplier of FIG. 1 may be adapted for use with signed binary numbers where the sign-magnitude representation is used by addition of an EXCLUSIVE-OR gate for processing the sign bits. The magnitude portion of the numbers may then be processed as in FIG. 1.

It can be seen from the above that the multiplier array may be constructed from basic processing cells which are more complex than cell 12. A basic cell may readily be constructed, for example, from four of the cells, 12, with internal latches between the cells removed. This cell would then take in two digits of a(n) and two digits of b(n) in one clock cycle. Alternatively, the logic for the "macrocell" (higher level processing cell) may be designed particularly for dealing with two bits of both a(n) and b(n) for greater efficiency.

More commonly, data words have a number of bits which is divisible by four. A macrocell equivalent to a 4×4 array of cells, 12, may then be used.

Figure 4:
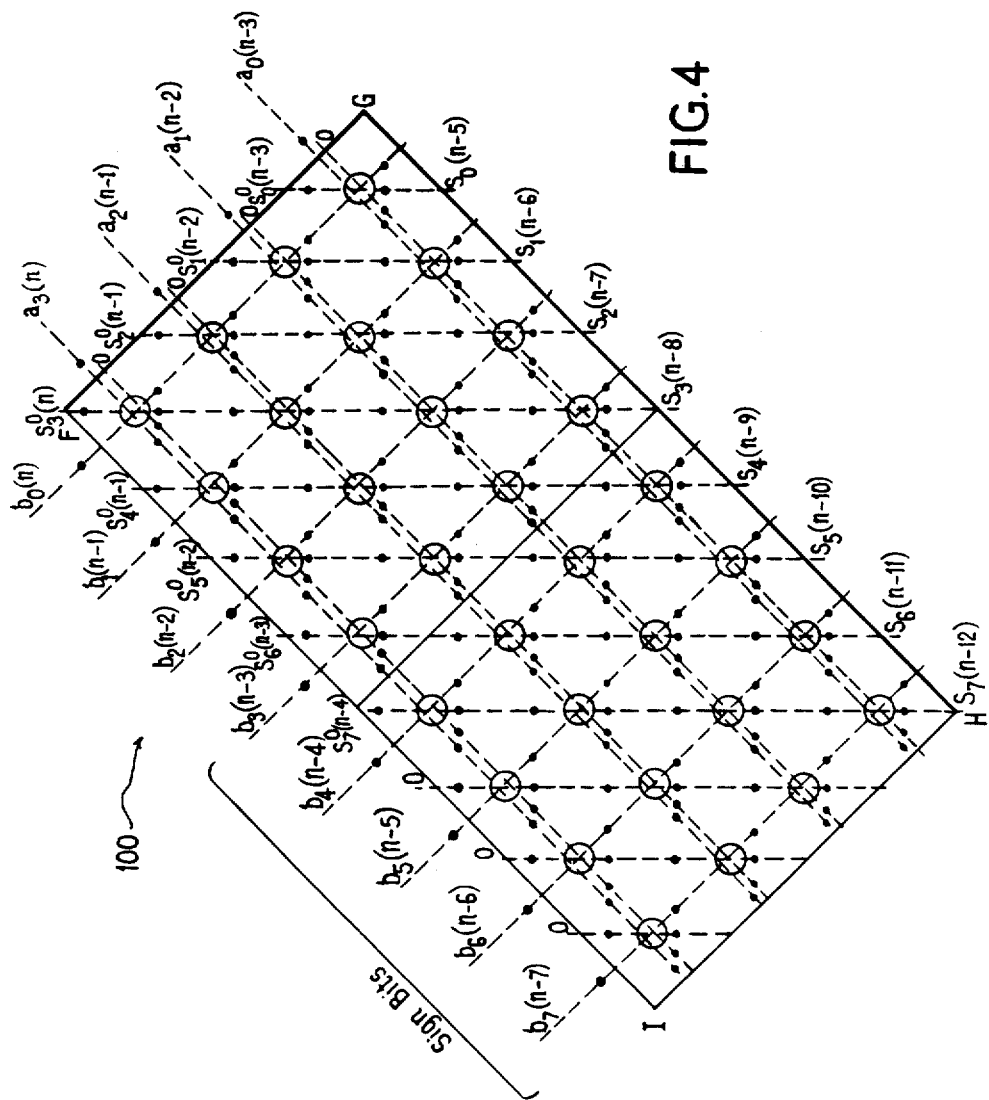

For multiplication of signed binary numbers a(n) and b(n) in four-bit two's complement form ie in the form of a four-bit number in which the sign is incorporated in the number, the pipelined multiplier of FIG. 4 may be used.

For a four-bit two's complement number, x, the value of x in base ten is given by $$x = -2^3 x_3 + \underline{\bar{x}}$$

where $$\underline{\bar{x}} = 2^2 x_2 + 2x_1 + x_o$$

For application of the circuit of FIG. 4, the numbers a(n) and b(n) are first considered in eight-bit two's complement notation. Any integer in the region $-2^7$ to $2^7 - 1$ may be represented uniquely in this way and, in particular, a four-bit two's complement number takes its original four-bit two's complement form with the sign bit extended into the four most significant places. For a(n) positive, its sign bit is zero and therefore four bits are sufficient to represent it in eight-bit two's complement form.

The product of two four-bit two's complement numbers must be within the range $-2^7$ to $2^7 - 1$. Consequently the entire calculation of $a(n) \times b(n)$ may be carried out in eight-bit two's complement rotation. For a(n) positive the calculation is effected by multiplying the four-bit two's complement form of a(n) by the eight-bit two's complement form of b(n) and ignoring terms in $2^8$ and greater which are generated in the process. The result, s(n), is the product $a(n) \times b(n)$ in eight-bit two's complement form.

In FIG. 4 this is performed in the multiplier shown which includes an array, 100, comprising two sixteen-cell square arrays of processing cells identical to the square array ABCD of FIG. 1. The digits of a(n) in four-bit two's complement form are input along edge FG of array 100 and the digits of b(n) in eight-bit two's complement form are input along edge FI of the array.

The array of FIG. 4 shows the more general case multiplication $$s(n) = s^o(n) + a(n) \times b(n) + c(n)$$

where $s^o(n)$ = number expressed in eight-bit two's complement form with a value sufficiently low to keep s(n) within eight-bits in two's complement form, and c(n) = a four-bit two's complement number = 0 in FIG. 4.

As in the FIG. 1 multiplier, the digits of a(n), b(n) and $s^o(n)$ are input so as to move through the multiplier in a staggered manner. Thus, at the time shown in the diagram, the digits $b_o(n)$, $b_1(n-1)$, $b_2(n-2)$, $b_3(n-3)$, $b_4(n-4)$, $b_5(n-5)$, $b_6(n-6)$, $b_7(n-7)$ arrive along edge FI for input simultaneously with the arrival of $a_3(n)$, $a_2(n-1)$, $a_1(n-2)$ and $a_o(n-3)$ along edge FG. This occurs simultaneously with the arrival of $s_o{}^o(n-3)$, $s_1{}^o(n-2)$, $s_2{}^o(n-1)$, $s_3{}^o(n)$, $s_4{}^o(n-1)$, $s_5{}^o(n-2)$, $s_6{}^o(n-3)$ and $s_7{}^o(n-4)$ along FG and FI for input. The digits of s(n) are output in a staggered manner along edge GH.

For a(n) negative its eight-bit two's complement notation occupies more than the four least significant bits. A shortened four-bit form may not therefore be used. Instead, the value $$a(n) = -2^3 a_3(n) + \bar{a}(n)$$

is taken and thus $$a(n) \times b(n) = \bar{a}(n) b(n) - a_3(n) 2^3 b(n)$$

By translating b(n) into one's complement notation $a(n) \times b(n)$ becomes $$2^3 a_3(n) \bar{b}(n) + \bar{a}(n) b(n) + a_3(n) 2^3 \quad (1)$$

where $\bar{b}(n)$ is an eight-bit positive integer, each of the bits, $\bar{b}_i(n)$, of which is the complement of the corresponding bit of b(n):

ie where $$b_i(n) = 0 \bar{b}_i(n) = 1$$

and where $$b_i(n) = 1 \bar{b}_i(n) = 0$$

Figure 5:
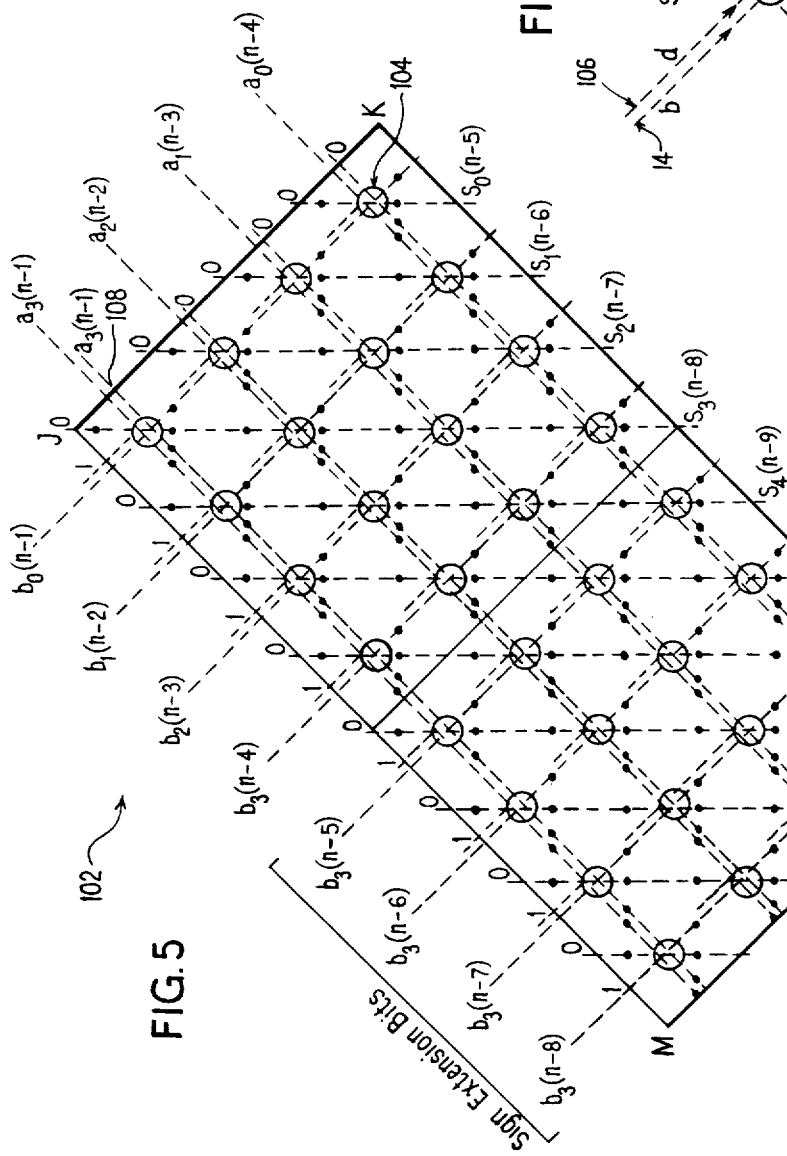

The product in equation "(1)" above is evaluated using the pipelined multiplier illustrated in FIG. 5.

The multiplier includes an array, 102, consisting of two adjacent sixteen-cell square arrays of identical processing cells, one of which is indicated at 104.

Figure 6:
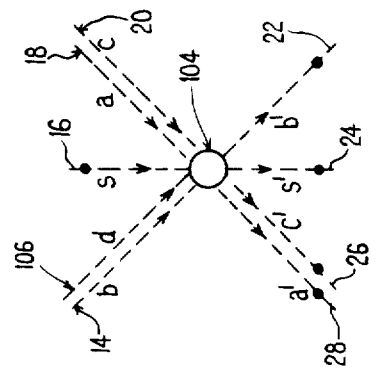

A cell, 104, is shown in more detail in FIG. 6.

Input lines 14, 16, 18 and 20 bring data into the cell in the form of bits b, s, a and c respectively in a similar manner to the equivalent lines of FIG. 2. Also, in a similar manner, output lines 22, 24, 26 and 28 take data away from the cell in the form of bits b', s', c' and a' respectively. Additionally, a fifth line, 106, brings a 'd' control input to the cell, 104, such that when d = 0 the value of b remains as b and when d = 1 the complement of b ie $\bar{b}$ is taken instead of b. Cell 104 then processes the input data in the same way as cell 12 of FIG. 2 using either b or $\bar{b}$ in the calculation according to whether d = 0 or 1 respectively.

In the array, 102, of FIG. 5, the d lines of the eight cells 104 adjacent to edge JM are all set to '1' in order to supply the first term of equation "(1)" while the remaining cells in the array have blank inputs (equivalent to 0) on their d lines, 106, in order to supply the second term of equation "(1)". The value of $a_3$ is input on $c_3$ line 108 so as to supply the third term of equation "(1)". In the type of processor of FIG. 5, c(n) is set to zero. The $c_2(n)$, $c_1(n)$ and $c_o(n)$ latches along edge JK are therefore set to 0. Numbers a(n) and b(n) in four-bit and eight-bit two's complement form respectively are then input in a staggered manner along edges JK and JM respectively as shown in the diagram, the result, s(n), being output in staggered manner along edge KL of the array 102.

By inputting d = 0 to the eight cells, 104, along edge JM and by inputting $a_3 = 0$ to line 108 it can be seen that the array for the pipelined multiplier of FIG. 5 becomes equivalent to the array for the pipelined multiplier of FIG. 4.

The array for the multiplier of FIG. 5 is particularly useful compared with prior art multipliers as the correction terms of equation "(1)" are incorporated into the array in one operation without the need for implementing additional operations and processing hardware. In, for example, some forms of prior art multipliers, multiplication of four-bit two's complement numbers a(n) and b(n) is performed using the form $$a(n) \times b(n) = (-2^3 a_3(n) + \bar{a}(n))(-2^3 b_3(n) + \bar{b}(n))$$

$$= a(n)\bar{b}(n) + 2^6 a_3(n) b_3(n) - 2^3 a_3(n) \bar{b}(n) - 2^3 b_3(n) \bar{a}(n)$$

ie three correction terms are involved and processed individually.

Although the d input is supplied on every cell in FIG. 5, it may alternatively be provided only on the cells along the edge JM. However, to retain the iterative nature of the design the input is preferably supplied on all cells.

Figure 7:
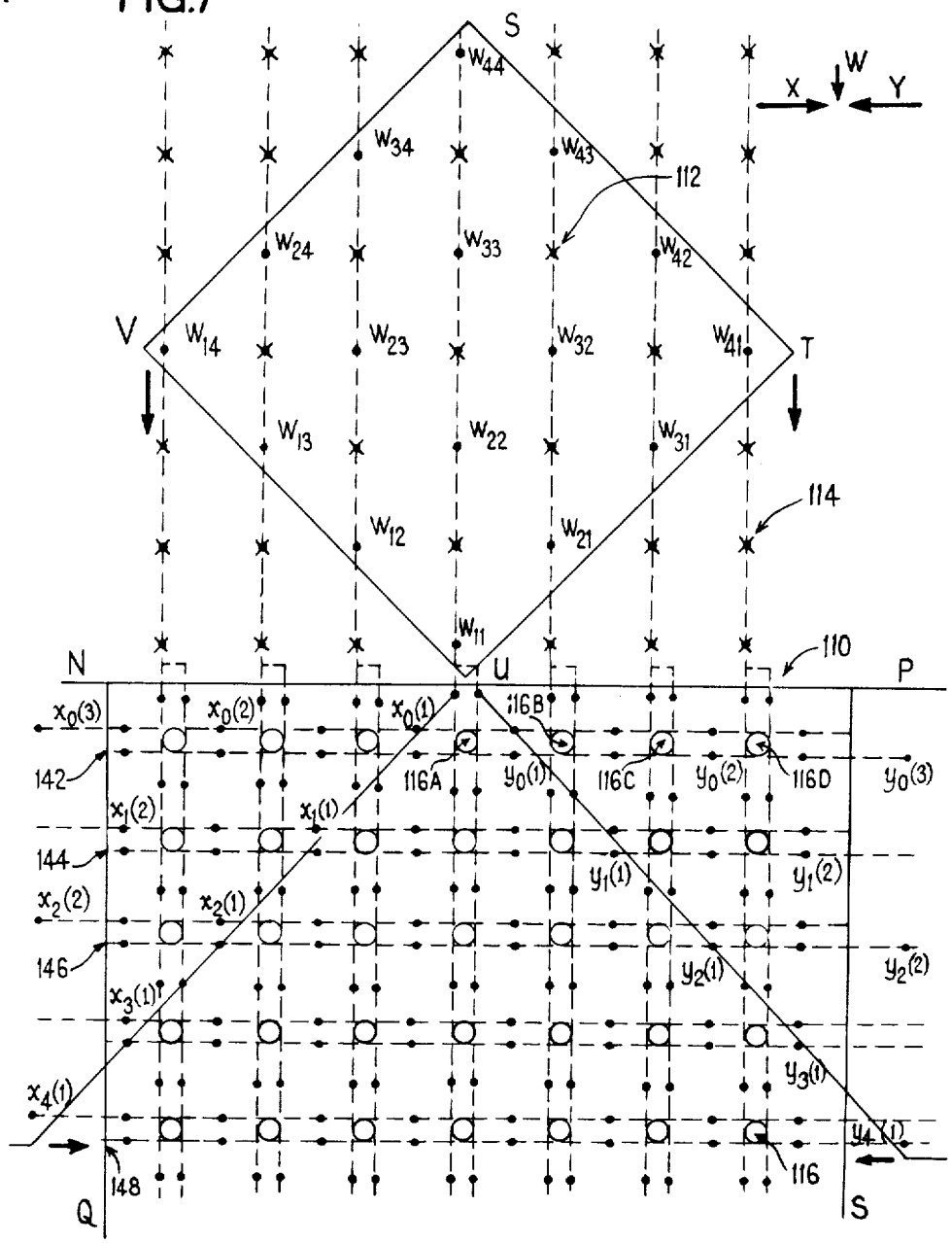

FIG. 7 depicts an array of processing cells, 110, for performing a one-bit Walsh transform ie a transform of the type $$Y = WX + Z$$

where

W = a Walsh transform matrix, the elements of which take the value

Z = a predetermined vector (= 0 in FIG. 7)

and

X, Y = vectors representing variable digital numbers, x and y

The processor of FIG. 7 is for use with a 4 × 4 matrix W and five-bit two's complement numbers x and y. Thus the calculation is:

$$Y = WX$$

$$\Rightarrow \begin{pmatrix} y(n) \\ y(n+1) \\ y(n+2) \\ y(n+3) \end{pmatrix} = \begin{pmatrix} w_{11} w_{12} w_{13} w_{14} \\ w_{21} w_{22} w_{23} w_{24} \\ w_{31} w_{32} w_{33} w_{34} \\ w_{41} w_{42} w_{43} w_{44} \end{pmatrix} \begin{pmatrix} x(n) \\ x(n+1) \\ x(n+2) \\ x(n+3) \end{pmatrix}$$

The diagram in FIG. 7 illustrates the arrangement of the bits involved in the processing immediately prior to calculation of:

$$\begin{pmatrix} y(1) \\ y(2) \\ y(3) \\ y(4) \end{pmatrix} = W \begin{pmatrix} x(1) \\ x(2) \\ x(3) \\ x(4) \end{pmatrix}$$

The elements of W and and x(1), x(2), x(3) and x(4) are input to memory sites as shown (x(4) and some of the digits of x(3) and x(2) are not shown in FIG. 7). Since Z=0 the memory sites of array 110 labelled as $y_0(1)$, $y_1(1)$, $y_2(1)$, $y_3(1)$, $y_4(1)$, $y_0(2)$, $y_1(2)$, $y_2(2)$ and $y_0(3)$ are initially set to zero, but are labelled with the above y bits for better understanding of the progress of these digits through the processor until they are output across edge NQ in the diagram. For non-zero Z, the above y bits would be set accordingly.

Memory sites not containing the elements of x, y or W as shown initially contain blank information (equivalent to digital value 0). These sites are indicated by crosses such as 114 in the upper section of FIG. 7 above line NP. For clarity, no crosses are shown in the lower section of FIG. 7 below NP.

The arrangement of FIG. 7 is somewhat simplified in that it implies that the $w_{ij}$ are single bit numbers occupying one conducting line each. However, in order to accommodate blank (0) values as well as 1 and $-1$, the $w_{ij}$ must take a two bit form ($u_{ij}$, $v_{ij}$).

A possible two bit form which may be used (but not the only possible form) is:

| $(u_{ij}, v_{ij})$ | $w_{ij}$ |
|---|---|
| (0,0) = | 0 |
| (1,0) = | 1 |
| (0,1) = | $-1$ |

Figure 8:
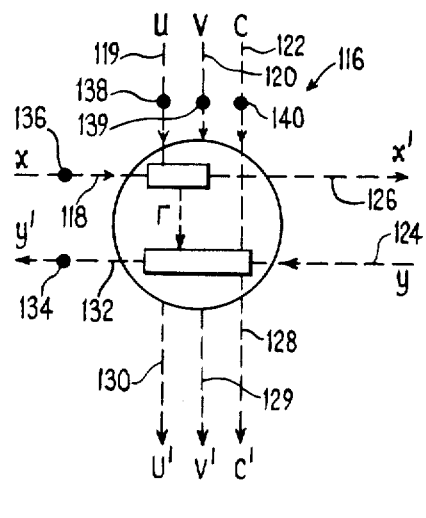

In order to implement this form, the array, 110, of FIG. 7 consists of 7×5 identical processing cells such as 116 which is shown in more detail in FIG. 8.

In FIG. 8 the cell, 116 has input lines 118, 119, 120, 122 and 124 for bringing input bits x, u, v, c and y respectively and lines 126, 128, 129, 130 and 132 for outputting bits x', c', v', u' and y' respectively. Latches 134, 136, 138, 139 and 140 in the form of memory sites, each for storing a single bit are disposed in lines 132, 118, 119, 120 and 122 respectively.

Each cell repeatedly performs a cell operation which calculates:

$$x' = x$$

$$w' \begin{Bmatrix} u' = u \\ v' = v \end{Bmatrix} w$$

$$y' = y \oplus c \oplus r$$

$$c' = (y \cdot c) + (y \cdot r) + (c \cdot r)$$

where $r = x \cdot u \cdot \bar{v} + \bar{x} \cdot \bar{u} \cdot v$

The 'c' input lines along edge NP of array 110 equivalent to line 122 of FIG. 8 are connected to the 'v' input line so that when $v_{ij}=1$ (i.e. when $w_{ij}=-1$), 1 is added to the appropriate significant bit of y.

The operation of the processor of FIG. 7 is controlled by a clocking means (not shown) which, in one clock cycle, outputs a first type of clock pulse which causes each memory site to output its stored bit followed by a second type of clock pulse which causes each memory site to store an incoming bit. For memory sites above the line NP, stored bits or stored blanks pass directly to the adjacent memory site below in one clock cycle whereas, for memory sites below line NP, stored bits or stored blanks pass from each site to an adjacent processing cell with the first type of clock pulse and resulting bits pass from the cell to adjacent memory sites with the second type of clock pulse.

In general, in operation of the processor, the W elements and accompanying blanks move vertically downwards by one processing cell repeat distance per clock cycle, the X elements and adjacent blanks move horizontally to the right by one repeat distance per clock cycle and the Y elements and adjacent blocks move horizontally to the left by one repeat distance per clock cycle.

The operation of the processor may be better understood by considering the sequence of events occurring in four of the cells, 116A, 116B, 116C and 116D.

On occurrence of the initial first clock pulse, $x_0(1)$, $y_0(1)=0$, $c=v_{11}$ and $w=w_{11}=(u_{11}, v_{11})$ are input to cell 116A and, on occurrence of the initial second clock pulse, the following bits are output:

$x' = x_0(1)$ is output to the memory site on cell 116A's output line, 126

$w' = (u', v') = (u_{11}, v_{11})$ is output to the memory sites on cell 116A's output lines 129 and 130

$$y' = 0 \oplus v_{11} \oplus (x_0(1) \cdot u_{11} \cdot \bar{v}_{11} + \bar{x}_0(1) \cdot \bar{u}_{11} \cdot v_{11})$$

$$= v_{11} \oplus (x_0(1) \cdot u_{11} \cdot \bar{v}_{11} + \bar{x}_0(1) \cdot \bar{u}_{11} \cdot v_{11})$$

is output to the memory site on cell 116A's output line, 132 and $$c' = (0 \cdot v_{11}) + (0 \cdot (x_0(1) \cdot u_{11} \cdot \bar{v}_{11} + \bar{x}_0(1) \cdot \bar{u}_{11} \cdot v_{11})) + v_{11} \cdot (x_0(1) \cdot u_{11} \cdot \bar{v}_{11} + \bar{x}_0(1) \cdot \bar{u}_{11} \cdot v_{11})$$

$$= v_{11} \cdot (x_0(1) \cdot u_{11} \cdot \bar{v}_{11} + \bar{x}_0(1) \cdot \bar{u}_{11} \cdot v_{11})$$

is output to the memory site on cell 116A's output line, 128.

Simultaneously, cell 116C receives inputs $y_2(2)=0$, $x=0$, $w=(u,v)=0$, $c=0$ on its input lines 124, 118, (119, 120) and 122 respectively.

The resulting output bits are $y' = y_0(2) = 0$ on line 132 $x' = 0$ on line 126, $c' = 0°$ on line 128, and $w' = (u' \cdot v') = 0$ on lines 129 and 130. Simultaneously, cell 116B receives 0 inputs on each of its lines 118, 119, 120, 122 and 124. Consequently, the cell outputs 0 on each of its output lines 126, 129, 128, 130 and 132. In addition, cell 116D receives 0 inputs on each of its input lines 118, 119, 120, 122 and 124 and outputs 0 on each of its output lines 126, 128, 129, 130 and 132.

At the second clock cycle the following takes place:

On the first type of clock pulse, cells 116A and 116C receive $x=0$, $w=0$, $c=0$, $y=0$ on their input lines 118, 119, 120, 122 and 124 respectively and therefore output $x'=0$, $c'=0$, $w'=0$, $y'=0$ on output lines 126, 128, 129, 130 and 132 respectively on the second type of clock pulse.

Simultaneously, on the first type of clock pulse, cell 116B receives:

$x_o(1)$ on line 118
$w_{21}$ on lines 119 and 120
$c = v_{21}$ on line 122 and $y_o(2) = 0$ on line 124 and, on the second pulse, outputs $x_o(1)$ on line 126

$$c' = (0 \cdot v_{21}) + (0 \cdot (x_0(1) \cdot u_{21} \cdot \bar{v}_{21} + \bar{x}_0(1) \cdot \bar{u}_{21} \cdot v_{21})) + (v_{21} \cdot (x_0(1) \cdot u_{21} \cdot \bar{v}_{21} + \bar{x}_0(1) \cdot \bar{u}_{21} \cdot v_{21}))$$

$$= v_{21} \cdot (x_0(1) \cdot u_{21} \cdot \bar{v}_{21} + \bar{x}_0(1) \cdot \bar{u}_{21} \cdot v_{21})$$

on line 128

$w_{21}$ on lines 129 and 130

$$y' = 0 \oplus v_{21} \oplus (x_0(1) \cdot u_{21} \cdot \bar{v}_{21} + \bar{x}_0(1) \cdot \bar{u}_{21} \cdot v_{21})$$

$$= v_{21} \oplus (x_0(1) \cdot u_{21} \cdot \bar{v}_{21} + \bar{x}_0(1) \cdot \bar{u}_{21} \cdot v_{21})$$

on line 132.

Simultaneously, on the first type of clock pulse, cell 116D receives:

$x = 0$
on line 118

$w = 0$
on line 119 and 120

$c = 0$
on line 122 and $y = y_o(3) = 0$
on line 124 and, on the second clock pulse, outputs $x' = 0$
on line 126

$c' = 0$
on line 128

$w' = 0$
on line 129 and 130

$y' = y_o(3) = 0$
on line 132

The first digit to be output from the processor is $y_o(1)$ which emerges at port 142 four clock cycles after the processing begins. $y_1(1)$ then emerges at port 144 after five clock cycles with $y_2(1)$ reaching port 146 and $y_o(2)$ reaching port 142 after six clock cycles, etc. The matrix multiplication $$\begin{pmatrix} y(1) \\ y(2) \\ y(3) \\ y(4) \end{pmatrix} = W \begin{pmatrix} x(1) \\ x(2) \\ x(3) \\ x(4) \end{pmatrix}$$

is completed when $y_4(4)$ reaches port 148 sixteen clock cycles after processing begins.

Although only one matrix, W, is shown in FIG. 7 with its digits input to area STUV, in operation of the processor, as the elements of the first matrix, W, descend vertically at each clock cycle, the elements of a second matrix, W, are input to take their places. Equally, after input of the elements of x(1), x(2), x(3) and x(4) along edge NQ and y(1), y(2), y(3), y(4)=0 along edge PS, the elements of x(5), x(6), x(7) and x(8) are input in a staggered manner across NQ and y(5), y(6), y(7), y(8)=0 across PS. In this way a new matrix multiplication $$\begin{pmatrix} y(5) \\ y(6) \\ y(7) \\ y(5) \end{pmatrix} = W \begin{pmatrix} x(5) \\ x(6) \\ x(7) \\ x(8) \end{pmatrix}$$

begins on the ninth clock cycle with digits $x_o(5)$, $w_{11}$, $c = v_{11}$ and $y_o(5) = 0$ being input to processing cell 116A.

The numbers, x, originally take three-bit, two's complement form, but are extended to five-bit two's complement form for simplicity. This may be appreciated by considering that, in three-bit two's complement form, x, will lie in the range $-2^2$ to $2^2 - 1$ ie $-4$ to $+3$ Additionally, for a four-point transform $$y(i) = w_{i1} x(n) + w_{i2} x(n+1) + w_{i3} x(n+2) + w_{i4} x(n+3)$$
$$= +x(n) + x(n+1) + x(n+2) + x(n+3)$$

Therefore, the maximum value of y is $+12$ ie when $w_{i1} = w_{i2} = w_{i3} = w_{i4} = 1$ and the minimum value of y is $-16$ ie when $w_{i1} = w_{i2} = w_{i3} = w_{i4} = -1$ y thus lies within the range $-2^4$ to $2^4 - 1$ and can therefore be represented in five-bit two's complement form.

In common with the pipelined multiplier, a macrocell array may also be used with the Walsh Transform processor.

It can be seen that the FIG. 7 processor may be adopted for the less complicated matrix multiplication where the $w_{ij}$ take only the values 0 or 1. In this case the $w_{ij}$ would take their conventional one-bit form. The processor array may then be considered as a 'bit slice' array and several bit slice arrays may be employed for matrix multiplication where the $w_{ij}$ are multi-bit numbers.

Equally, the Walsh transform processor array of FIG. 7 may be employed, alongside a stack of other similar processor arrays to cater for multi-bit $w_{ij}$ values.

The processing cell for the case where $w_{ij}$ takes the value 0 or 1 would be such that:

$x' = x$     $y' = y \oplus (w \cdot x) \oplus c$
$w' = w$     $c' = (w \cdot x) \cdot y + (w \cdot x) \cdot c + y \cdot c$ It can be seen that the FIG. 7 processor may be adapted for less complicated matrix multiplication where the $w_{ij}$ take only the values 0 or 1. In this case the $w_{ij}$ would take their conventional one-bit form. The processor array may then be considered as a 'bit-slice' array and a stack of several bit-slice arrays may be employed for matrix multiplication where the $w_{ij}$ are multi-bit numbers.

Equally, the Walsh transform processor array of FIG. 7 may be employed alongside a stack of other similar processor arrays to cater for multibit $w_{ij}$ values.

It can be seen from FIG. 7 that the data processor depicted therein is relatively inefficient in its use of chip space since, at any one time, only half of the processing cells in array 110 are computing a partial product bit which contributes to the sum. This arises due to the movement of the x and y in opposite directions simultaneously.

In an improvement of the FIG. 7 processor, the x are made to remain stationary while the y move one processing cell to the left. The y are then made to remain stationary while the x move one processing cell to the right. The result is a reduction in the required number of processing cells.

Figure 9:
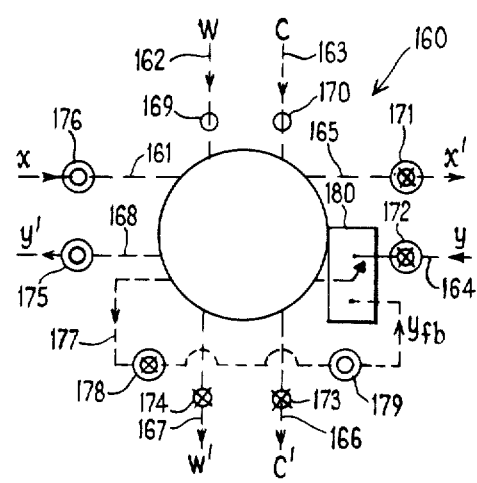

A processing cell for use in an improved processor is illustrated in FIG. 9.

In FIG. 9 an improved processing cell, 160, has input lines 161, 162, 163 and 164 for bringing input bits x, w, c and y respectively and output lines 165, 166, 167 and 168 for outputting bits x', c', w' and y' respectively. Latches are also shown associated with cell 160. However, unlike the latches shown in FIGS. 2, 6 and 8, in FIG. 9 each latch is depicted as two half latches. Thus half latches 169, 170, 171, 172, 173, 174, 175 and 176 are disposed in lines 162, 163, 165, 164, 166, 167, 168 and 161 respectively.

In addition to the x, w, c, y, x', w', c' and y' lines, the cell 160 includes a feed back line, 177, in which are disposed two half latches, 178 and 179, and a switch, 180. Line 117 carries a digit, $y_{fb}$, into the cell.

Figure 10:
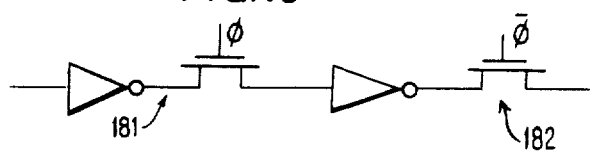

A more detailed picture of the type of latch used in the processing cell, 160, is illustrated in FIG. 10.

Figure 11:
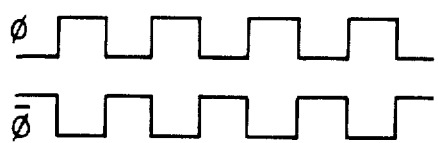

FIG. 10 illustrates a master/slave latch consisting of a master section, 181, and a slave section, 182. The latch is controlled by two square wave clocking waveforms, $\phi$ and $\bar{\phi}$, which are illustrated graphically (voltage vs time) in FIG. 11. Passage of data bits through the master section, 181, is governed by the $\phi$ pulses and passage of data bits through the slave section, 182, is governed by the $\bar{\phi}$ pulses.

It can be seen from FIG. 10 that the latch may be considered as consisting of a separate master half, 181, and a separate slave half, 182.

Figure 12:
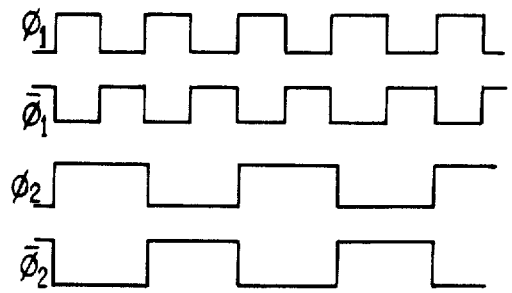

Returning to FIG. 9, the operation of the processing cell, 160, is governed by four clocking waveforms, $\phi_1$, $\bar{\phi}_1$, $\phi_2$ and $\bar{\phi}_2$, which are illustrated in graphical form in FIG. 12. Thus latches 169 and 170 are controlled by $\phi_1$, latches 173 and 174 by $\bar{\phi}_1$, latches 175, 176 and 179 by $\phi_2$ and latches 171, 172 and 178 by $\bar{\phi}_2$. In addition, switch 180 is controlled by $\phi_2$ and $\bar{\phi}_2$ such that, on occurrence of a $\phi_2$ peak, the switch closes to connect feed back line 177 to cell 160 and, on occurrence of a $\bar{\phi}_2$ peak, the switch closes to connect line 164 to the processing cell.

In operation the effect of the four clocking waveforms is to allow passage of w and c bits through the array at twice the rate of the x and y bits. In addition, each x value input to the cell takes part in two processing cell operations before the succeeding x value is input. The y input values are likewise updated at half the frequency of the w and c values. However, in their case, the value y is input to the cell for the first of the two operations and the value $y_{fb}$ is input for the second. It can also be seen from FIG. 9 that, since the x half latch, 176, is clocked by $\phi_2$ and the y half latch, 172, is clocked by $\bar{\phi}_2$, the general movement of x rightwards is 180° out of step with the general movement of y leftwards.

The logic operations of cell 160 may be summed up as:

$$x' = x$$

$$w' = w$$

$$y' = \bar{y} \oplus (w \cdot x) \oplus c$$

$$c' = (w \cdot x) \cdot \bar{y} + (w \cdot x) \cdot c + \bar{y} \cdot c$$

where $$\bar{y} = y \cdot \bar{\phi}_2 + y_{fb} \cdot \phi_2$$

Figure 13:
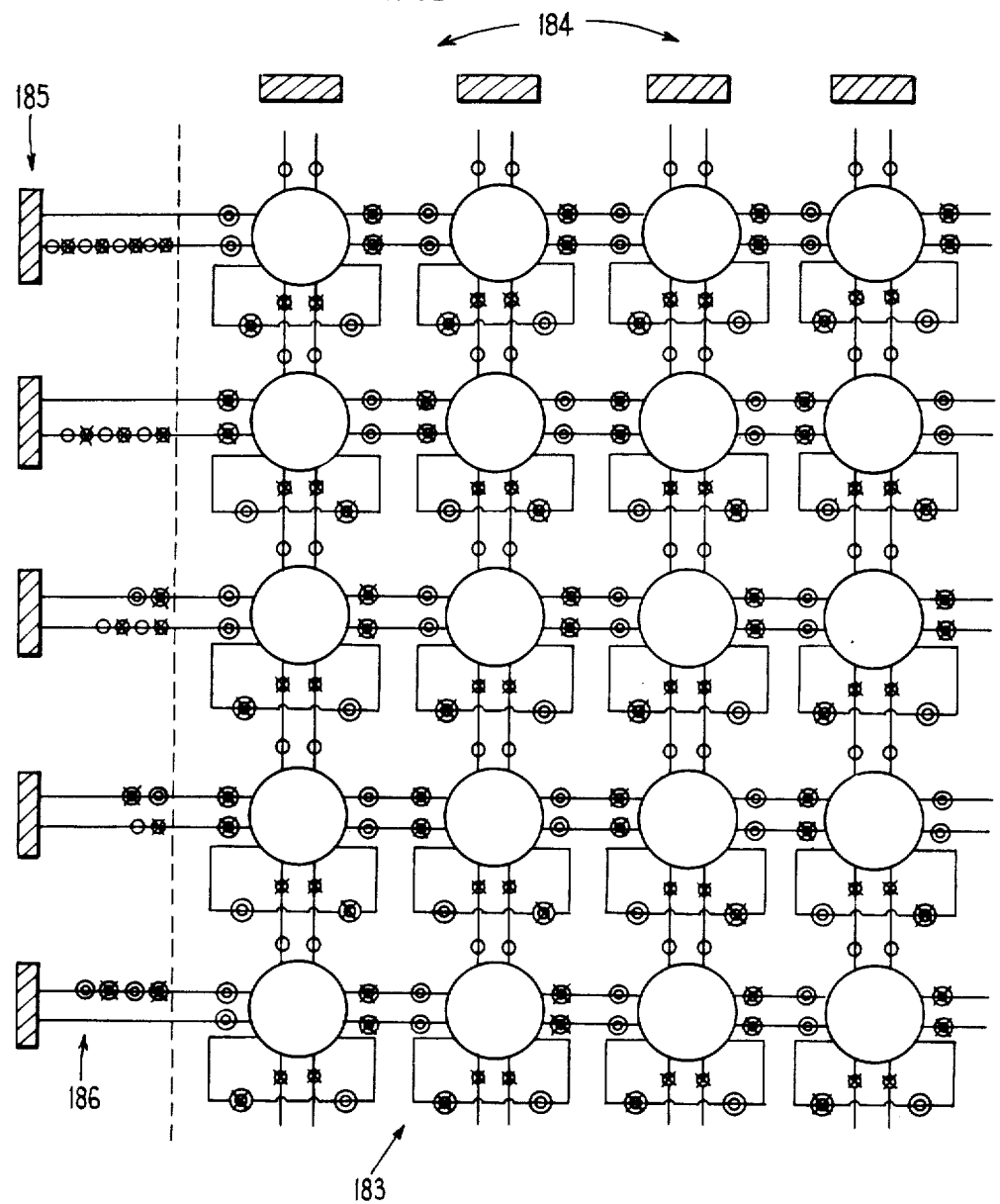

In FIG. 13 a data processor having a complete array of cells similar to the processing cell of FIG. 9 is shown for calculating $$Y = WX$$

where
- X = a vector representing variable numbers x which are three bits wide, but which have been sign extended to five bits
- Y = a vector representing resulting five bit wide numbers, y
- W = a 4×4 Walsh transform matrix the elements of which represent the values 1 or −1 or a 4×4 bit-slice transform matrix the elements of which represent the values 1 or 0.

In FIG. 13 the data processor has an array, 183, consisting of 4×5 processing cells of similar nature to the cell 160 of FIG. 9.

It is be noted in FIG. 13 that the processing cells in the first (top), third and fifth rows of array 183 are identical to the cell of FIG. 9 whereas the cells in the second and fourth rows of array 183 have their x, x', y, y' and $y_{fb}$ lines clocked in anti-phase with the corresponding lines in FIG. 9.

Included in the data processor of FIG. 13 are input pads, 184, along the upper edge of array 183 for inputting the values of w and along the left-most edge of the array are pads, 185, for inputting the values of x and outputting the values of y. An array of latches, 186, is provided between the pads, 185 and the left hand edge of array 183 in order to provide time skew for the input x bits and time deskew for the output y' bits, allowing the x to be input in parallel and the y to be output in parallel.

Figure 14:
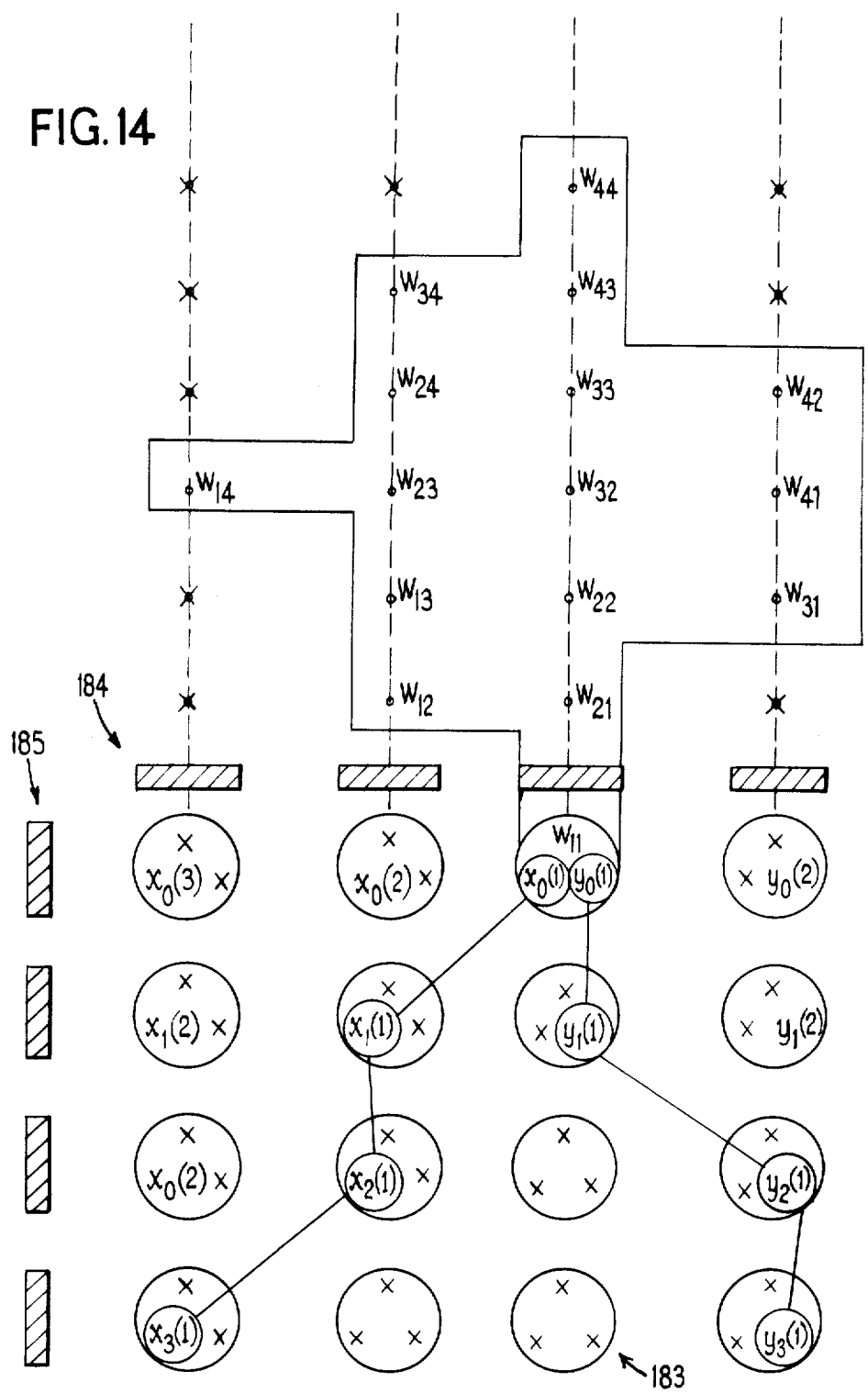

The mode of input of bits w to array 183 is illustrated in FIG. 14.

As can be seen from FIG. 13, the effect of employing a processing cell as in FIG. 9 instead of a processing cell as in FIG. 8 is to reduce the 7×5 cell array (FIG. 7) required for a four-point transform to 4×5 cells. Consequently, although the FIG. 9 cell is more complex than the FIG. 8 cell, the the final data processor occupies a reduced chip area. In addition, fewer input pads are required in the FIG. 13 array than in the FIG. 7 array.

From the foregoing it can be seen that, in general, the invention allows the fabrication of processors with totally regular repetitive designs. In applications of the invention the design problem is therefore restricted to the design of a single processing cell. Having proven a single cell, the whole processor array is proven since the processor consists merely of single cells connected to immediate neighbouring cells.

The iterative property of the design is advantageous in allowing processors able to deal with more bits per number to be made. The processors are enlarged merely by adding more processing cells to the array and this can be done without cost to the speed of operation of the processors. These advantages are particularly important in LSI and VLSI where the number of hardware components involved rapidly becomes unmanageable for less systematic designs.

Considering the simple pipelined multiplier of FIG. 1 for example, this may be expanded to allow multiplication of a(n) (l bits per word) by b(n) (m bits per word) by providing a rectangular array of l×m processing cells adjoined to a triangular array of 1/2 (l+1) cells.

More commonly, data words have a number of bits which is divisible by four, thus allowing the sixteen cell square array to become a unit array which may be used as a basic building block. In addition the larger building block may be constructed with all internal latches removed so as to effectively form a new unit processing cell.

The two's complement pipelined multiplier of FIG. 5 is particularly useful in that the design allows larger processors to be built up easily merely by adding on further cells and ensuring a d=1 input along the array edge across which the b(n) digits cross. In prior art two's complement multipliers additional circuits are incorporated to allow correction terms to be processed therefore preventing simple adjoining of basic modules without reprogramming for fabrication of a larger multiplier.

Although the latency of the inventive processors (ie the net number of clock cycles required between input of data and output of a complete answer) is relatively high (for example, the latency of the pipelined multiplier of FIG. 1 is twelve), for data processors which repeatedly carry out the same operation, this disadvantage is offset by the fact that the pipelining allows input of a data word at each clock cycle or at every second clock cycle according to the type of processor. The final clock rate is a function of the delay in processing one batch of data bits in a processing cell only and the maximum rate attainable is equal to the processing cell delay. The inventive design allows this delay to be made very small.

The inventive processor design promotes high frequency processing since, in one clock cycle, data is passed only as far as the nearest latch—a distance which can be made very small, particularly in VLSI. Transmission of data over long connecting lines and resulting time delays, especially the long delays resulting when transmission line effects come into play, are, therefore, avoided. The associated problems of introducing stray capacitance when using extensive data transmission lines are also avoided thereby eliminating the need for large drivers to broadcast the data across the chip. Equally alleviated are the difficulties concerning power dissipation of large drivers and the drivers themselves both taking up large amounts of chip area and introducing further driver chain time delays. In the inventive design the necessary driving is effectively incorporated into the latching circuits, thereby giving a distributed power consumption.

By using the inventive design, synchronization of timing is readily achieved as the processing cells are of simple design and data is transmitted to neighbouring cells only. Additionally, propagation delays are made independent of data word size unlike, for example, prior art pipelined and ripple-through processors in which one processing step includes the broadcasting of a bit of b(n) to each bit of a(n) before the processing step is complete.

A further advantage of the inventive design is that, by avoiding driving problems, the size of the processor is not limited by data word size.

A still further advantage of the inventive design is the economy in chip area used as a result of interconnections running between immediately neighbouring processing cells only.

The control of the inventive processor is relatively simple since very few types of clock signals are required for controlling the latches.

The inventive processor may be considered as consisting of successive pipeline stages. The timing constraints for the inventive processor are therefore firstly, that the timing line path lengths should be arranged so that pulses within any given stage are synchronised, and, secondly, that the delays between adjacent stages are such that, when a first stage is outputting bits to a neighbouring stage, the neighbouring stage comes under the influence of a timing pulse controlling storage of data and not a timing pulse which controls output of data. If the neighbouring stage were under the influence of a timing pulse controlling output of data, the data would pass through the neighbouring stage without being latched into the memory sites. Complete synchronization between stages is therefore not necessary, a degree of delay being tolerable.

As a modification of the inventive design, multiplexing of data words may be employed so as to economize on the number of input and output pins required in a single chip processor although this may decrease the overall speed of the processor.

A further modification of the inventive design involves inclusion of a degree of fault tolerance. The regularity of the design makes this particularly simple. For example, if a particular processing cell is found to be malfunctioning, the row and column containing the cell may be made redundant and a means of by-passing cells incorporated into the cell design so as to avoid use of the cells on the row and column. The by-pass connections may be activated using, for example, a form of matrix address control or may be activated using burning of non-chip links by means of, for instance, current pulse or laser techniques.

In a more general architecture a chip incorporating the inventive design may take the form of an uncommitted cell array, the necessary circuit connections for the required array being formed in a subsequent metallization process. The invention is particularly suited to this type of design since many applications require similar cells. The possible variations, are, therefore readily accommodated on the chip for later wiring. Additionally, due to the regularity of the architecture, laying of subsequent metallizations is relatively uncomplicated.

The inventive design may operate at a sufficiently high frequency to enable use of dynamic latches and, therefore, be particularly suited for the use of MOS technology. By using dynamic in contrast to the more bulky static latches, a minimum of chip area is therefore occupied by latches. Additionally, the increased design problems associated with MOS (eg the need for good impedance matching and good synchronization in opening and closing of transmission gates so as to prevent back-flow of charge) and the concomitant complex testing and simulation of the circuits required during design are alleviated as a result of the regularity of the architecture. The additional difficulty arising from the need to minimize stray capacity in order to minimize required driving power is also alleviated due to the minimum of interconnecting lines in the inventive design.

We claim:

1. A processing system including at least one digital data processor for carrying out a given calculation said at least one digital data processor including:
   (1) a two-dimensional array of bit-level processing cells each arranged to perform a twos complement multiplication operation upon input bits to produce output bits, at least some of the cells being arranged such that one of the input bits to be multiplied is complemented or uncomplemented according to the value of an input control bit;
   (2) a plurality of storing means associated with each processing cell, each storing means being arranged exclusively for receipt and subsequent output of successive bits from a respective cell output in response solely to clock signal activation and delaying successive bits appropriately to cascade array logic operations;
   (3) cell interconnection lines arranged in a scheme appropriate for the multiplication and providing cell output bit routes from respective storing means to neighboring cells, the said scheme providing successive predetermined intercell paths both for bits input to the array and for cascading array logic operations;
   (4) digital data input means responsive to clock signal activation to provide the array with a predetermined flow of input bits appropriate for the multiplication;
   (5) clocking means for sole control of calculation execution, the clocking means being arranged to generate clock signals timed to activate the digital data input means and storing means repetitively as appropriate to cascade array logic operations; and
   (6) output lines for receiving respective calculation result bits, the output lines being connected to respective processing cell outputs each appropriate to provide output bits resulting from arithmetic logic operations cascaded through the array.

2. A digital data processor as in claim 1 wherein the digital data input means is arranged to input data words corresponding to at least two parameters.

3. A digital data processor as in claim 1 wherein:
   (1) the clocking means includes first and second clocks providing respective first and second clock signals of like frequency and in anti-phase, and
   (2) each storing means consists of at least one one-bit latch, the latch being operative on pulses of said first clock signal to output a latched bit from a first cell to a second cell, and on pulses of said second clock signal to latch a bit received subsequently from said first cell.

4. A digital data processor as in claim 1 wherein the digital data input means is arranged for accepting data word bits in parallel and for inputting data words to the array in a bit-staggered manner.

5. A digital data processor as in claim 4 wherein the digital data input means includes a plurality of delay lines having varying time delays, connected to the array and arranged to effect input of data word bits to the array in a staggered manner.

6. A processing system including at least one digital data processor for calculating $Y = WX$, where:
   $Y$ = a vector of m k-bit binary numbers $y(p)$ with $p = 1$ to m, each having a respective tth bit $y_t(p)$ with $t = 0$ to $k-1$,
   $X$ = a vector of m k-bit binary numbers $x(q)$ with $q = 1$ to m, each having a respective uth bit $x_u(q)$ with $u = 0$ to $k-1$,
   $w$ = a matrix of one-bit binary numbers each designated w equal to either 0 or 1, said at least one digital data processor including:
   (1) a two-dimensional array of bit-level processing cells each arranged to receive input bits and generate output bits in accordance solely with invariant arithmetic logic;
   (2) a plurality of storing means associated with each processing cell, each storing means being arranged exclusively for receipt and subsequent output of successive bits from a respective cell output in response solely to clock signal activation and delaying successive bits appropriately to cascade array logic operations;
   (3) cell interconnection lines arranged in a scheme appropriate for the calculation and providing cell output bit routes from respective storing means to neighboring cells, the said scheme providing successive predetermined intercell paths both for bits input to the array and for cascading array logic operations;
   (4) digital data input means responsive to clock signal activation to provide the array with a predetermined flow of input bits appropriate for the calculation;
   (5) clocking means for sole control of calculation execution, the clocking means being arranged to generate clock signals timed to activate the digital data input means and storing means repetitively as appropriate to cascade array logic operations; and
   (6) output lines for receiving respective calculation result bits, the output lines being connected to respective processing cell outputs each appropriate to provide output bits resulting from arithmetic logic operations cascaded through the array, and wherein:
      (a) each cell has the logic operation comprising receiving input bits $y = y_t(p)$, $x = x_u(q)$, w and c, and generating output bits $y'$, $x'$, $w'$ and $c'$ given by:

$$x' = x$$

$$w' = w$$

$$y' = y \oplus (w \cdot x) \oplus c$$

$$c' = (w \cdot x) \cdot y + (w \cdot x) \cdot c + y \cdot c$$

(b) the array has first and second mutually remote edges each having at least k cells;
      (c) the array has a third edge adjacent both the first and second edges and having at least as many cells as there are matrix elements or numbers w in a major diagonal of W; and
      (d) the data input means, storing means, clock signal timing and cell interconnection lines are arranged such that each bit x of successive numbers x(q) of X is input to a respective uth second edge cell, successive parallel diagonals of W are input to the third array edge with each w being input to a respective cell, and each combination of bits x and w interacts at a respective cell with bits y and c assuming successive values in accordance with successive arithmetic logic operations.

7. A processing system including at least one digital data processor for calculating Y=WX, where:

W is a matrix of binary numbers designated w, equal to 1 or −1 and having two-bit values ($u_{ij}$, $v_{ij}$) having values (1,0), (0,1) or (0,0) representing 1, −1, or 0 respectively, and where Y = a vector of m k-bit binary numbers y(p) with p=1 to m, each having a respective tth bit Yt(p) with t=0 to k−1, X = a vector of m k-bit binary numbers x(q) with q=1 to m, each having a respective uth bit $x_u(q)$ with u=0 to k−1, said at least one digital data processor including:

(1) a two-dimensional array of bit-level processing cells each arranged to receive input bits and generate output bits in accordance solely with invariant arithmetic logic;

(2) a plurality of storing means associated with each processing cell, each storing means being arranged exclusively for receipt and subsequent output of successive bits from a respective cell output in response solely to clock signal activation and delaying successive bits appropriately to cascade array logic operations;

(3) cell interconnection lines arranged in a scheme appropriate for the calculation and providing cell output bit routes from respective storing means to neighboring cells, the said scheme providing successive predetermined intercell paths both for bits input to the array and for cascading array logic operations;

(4) digital data input means responsive to clock signal activation to provide the array with a predetermined flow of input bits appropriate for the calculation;

(5) clocking means for sole control of calculation execution, the clocking means being arranged to generate clock signals timed to activate the digital data input means and storing means repetitively as appropriate to cascade array logic operations; and (6) output lines for receiving respective calculation result bits, the output lines being connected to respective processing cell outputs each appropriate to provide output bits resulting from arithmetic logic operations cascaded through the array, and wherein:

(a) each cell is arranged to receive input bits y=$y_t(p)$, x=$x_u(q)$, $u_{ij}$, $v_{ij}$ and c, and generate output bits x', y', $u'_{ij}$, $v'_{ij}$ and c', the cell logic operation being given by:

$x' = x$ $u'_{ij} = u_{ij}$ $v'_{ij} = v_{ij}$ $y' = y + c + r$, where $r = x \cdot u_{ij} \cdot \bar{v}_{ij} + \bar{x} \cdot \bar{u}_{ij} \cdot v_{ij}$ $c' = (y \cdot c) + (y \cdot r) + (c \cdot r)$ (b) the array has first and second mutually remote edges each having at least k cells;

(c) the array has a third edge adjacent both the first and second edges and having at least as many cells as there are matrix elements or two-bit numbers ($u_{ij}$, $v_{ij}$) in a major diagonal of W;

(d) the data input means, storing means, clock signal timing and cell interconnection lines are arranged such that each bit x of successive numbers x(q) of X is input to a respective uth second edge cell, successive parallel diagonals of W are input to the third array edge with each w being input to a respective cell, and each combination of bits x, $u_{ij}$ and $v_{ij}$ interacts at a respective cell with bits y and c assuming successive values in accordance with successive arithmetic logic operations.

8. A digital data processor as in any one of claims 6 or 7 wherein the digital data input means is arranged to input the vector X to the array such that the bits $x_u(q)$ are interspersed by zeroes.

9. A digital data processor as in any one of claims 6 or 7 wherein the clocking means includes four clocks, two of which clocks have a clock cycle frequency equal to half the clock cycle frequency of the remaining two clocks.

10. A digital data processor as in claim 9 wherein each cell for the cell logic operation is arranged such that propagation through the array of bits consisting of successive values of w and c is controlled by the said remaining two clocks having a higher clock cycle frequency.

11. A digital data processor as in claim 6, wherein the digital data input means includes a plurality of delay lines.

12. A processing system according to claim 6 including k digital data processors and wherein the digital data input means is arranged such that the jth processor receives a respective matrix W having elements consisting of and arranged in W as individual bits (j−1)th in order of bit significance from multi-bit elements of a further matrix, where j=1 to k.

13. A digital data processor as in claim 7, wherein the digital data input means includes a plurality of delay lines.

14. A processing system including at least one digital data processor for calculating Y=WX, where:

Y = a vector of m k-bit numbers y(p) with p=1 to m, each having a respective $t^{th}$ bit $y_t(p)$ with t=0 to k−1;

X = a vector of m k-bit binary numbers x(q) with q=1 to m, each having a respective $u^{th}$ bit $x_u(q)$ with u=0 to k−1;

W = a matrix of one-bit binary numbers each designated w and equal to either 0 or 1 said at least one digital data processor including:

(1) a two-dimensional array of bit-level processing cells each arranged to receive input bits and generate output bits in accordance solely with invariant arithmetic logic;

(2) a plurality of storing means associated with each processing cell, each storing means being arranged exclusively for receipt and subsequent output of successive bits from a respective cell output in response solely to clock signal activation and delaying successive bits appropriately to cascade array logic operations;

(3) cell interconnection lines arranged in a scheme appropriate for the calculation and providing cell output bit routes from respective storing means to neighboring cells, the said scheme providing successive predetermined intercell paths both for bits input to the array and for cascading array logic operations;

(4) digital data input means responsive to clock signal activation to provide the array with a predetermined flow of input bits appropriate for the calculation;

(5) clocking means for sole control of calculation execution, the clocking means being arranged to generate clock signals timed to activate the digital data input means and storing means repetitively as appropriate to cascade array logic operations; and (6) output lines for receiving respective calculation result bits, the output lines being connected to respective processing cell outputs each appropriate to provide output bits resulting from arithmetic logic operations cascaded through the array, and wherein:

(a) each cell has the logic operation of responding to the following input bits:

$x = x_u(q)$ input upon a clock pulse beginning at $t = -2T$, w,c and y or $y_t(p)$ input upon a clock pulse beginning at $t = -T$, $w^*, c^*$ and $x^*$ or $x_u^*(q)$ upon a clock pulse beginning at $t = 0$, the * postscript indicating a successive bit of the relevant type, by generating corresponding output bits x′, w′, c′ and y′ as follows:

$x' = x^*$ upon a clock pulse beginning at time $t = T$ $w' = w^*$ upon a clock pulse beginning at time $t = T/2$ $c' = (w^* \cdot x^*) \cdot (y \oplus (w \cdot x) \oplus c) + (w^* \cdot x^*) \cdot c^* + (y \oplus (w \cdot x) \oplus c) \cdot c^*$ upon a clock pulse beginning at time $t = T/2$ $y' = (y \oplus (w \cdot x) \oplus c) \oplus (w^* \cdot x^*) c^*$ upon a clock pulse beginning at time $t = 0$, (b) the array has first and second mutually remote edges each having at least k cells, together with a third edge adjacent to the first and second edges having at least as many cells as there are matrix elements or numbers w in a major diagonal of W, (3) the clocking means is arranged to supply clock pulses to the data input means and storing means to effect input or throughput as appropriate of x, $x^*$, w, $w^*$, c, $c^*$, the clock pulses beginning at times 2nT and nT, where n = 0,1,2 ... m and m is a positive integer sufficiently large to allow passage of X and W through the array, (4) the data input means, cell interconnection lines and storing means are arranged such that each bit x of successive numbers x(q) of X is input to a respective uth second edge cell, successive parallel diagonals of W are input to the third array edge with each w being input to a respective cell, and each combination of bits x and w interact at a respective cell with bits y and c assuming successive values in accordance with successive arithmetic logic operations.

15. A digital data processor as in claim 14, wherein the digital data input means includes a plurality of delay lines.

* * * * *